United States Patent
Halter et al.

(10) Patent No.: US 10,915,312 B2
(45) Date of Patent: Feb. 9, 2021

(54) LIFECYCLE MANAGEMENT OF VIRTUAL COMPUTE TEMPLATES

(71) Applicant: VMware, Inc., Palo Alto, CA (US)

(72) Inventors: Bryan P. Halter, Merrimack, NH (US); Thomas J. O'Rourke, Warlingham (GB); Syed I. Ahmed, Mountain View, CA (US); Bhavin D. Sopariwala, Shrewsbury, MA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/460,144

(22) Filed: Jul. 2, 2019

(65) Prior Publication Data

US 2021/0004217 A1 Jan. 7, 2021

(51) Int. Cl.
*G06F 8/65* (2018.01)
*G06F 9/455* (2018.01)
*G06F 11/36* (2006.01)

(52) U.S. Cl.
CPC ............ *G06F 8/65* (2013.01); *G06F 9/45558* (2013.01); *G06F 11/3688* (2013.01); *G06F 2009/45562* (2013.01); *G06F 2009/45595* (2013.01)

(58) Field of Classification Search
CPC .... G06F 8/65; G06F 9/45558; G06F 11/3688; G06F 2009/45562; G06F 2009/45595
See application file for complete search history.

(56) References Cited

U.S. PATENT DOCUMENTS

| 8,914,783 | B2 * | 12/2014 | Van Camp | G06F 8/65 |
| | | | | 717/168 |
| 9,110,757 | B2 * | 8/2015 | Tian | G06F 8/65 |
| 9,384,028 | B1 * | 7/2016 | Felstaine | H04L 45/586 |
| 9,852,001 | B2 * | 12/2017 | Fitzgerald | H04L 63/1433 |

(Continued)

FOREIGN PATENT DOCUMENTS

| EP | 3032409 B1 * | 8/2018 | G06F 8/75 |
| JP | 5367074 B2 * | 12/2013 | G06F 8/61 |

OTHER PUBLICATIONS

Jain et al., "Prediction Model for Suitability of Resource Deployment Using Complex Templates in OpenStack", 2017, IEEE (Year: 2017).*

(Continued)

*Primary Examiner* — Wei Y Zhen
*Assistant Examiner* — Junchun Wu
(74) *Attorney, Agent, or Firm* — Kim & Stewart LLP (57) ABSTRACT

A method of updating templates includes maintaining libraries of the templates at a lifecycle management server to track versions and locations of the templates respectively stored in source, development, testing, and production data centers, copying a first template from the source data center to the development data center, storing the first template that has been updated at the development data center in the testing data center and performing unit testing on the updated first template at the testing data center, and upon successful unit testing, copying the updated first template from the development data center to the source data center and releasing the updated first template into production by storing the updated first template in the production data center. The library of the templates indicates the first template, prior to the update, as a first version, and after the update, as a later, second version.

20 Claims, 5 Drawing Sheets

(56) References Cited

U.S. PATENT DOCUMENTS

| | | | | |
|---|---|---|---|---|
| 10,162,664 B2* | 12/2018 | Cropper | ............ | G06F 9/45558 |
| 10,241,774 B2* | 3/2019 | Spivak | ............ | H04L 67/10 |
| 10,482,005 B1* | 11/2019 | Benny | ............ | G06F 8/75 |
| 2004/0107417 A1* | 6/2004 | Chia | ............ | G06F 8/65 |
| | | | | 717/171 |
| 2009/0019420 A1* | 1/2009 | Johnson | ............ | G06F 8/36 |
| | | | | 717/101 |
| 2009/0106178 A1* | 4/2009 | Chu | ............ | G06N 20/00 |
| | | | | 706/14 |
| 2013/0248045 A1* | 9/2013 | Williams | ............ | B01L 3/508 |
| | | | | 141/1 |
| 2013/0268913 A1* | 10/2013 | Anderson | ............ | G06F 8/70 |
| | | | | 717/120 |
| 2014/0282545 A1* | 9/2014 | Richards | ............ | G06F 9/5072 |
| | | | | 718/1 |
| 2014/0380308 A1* | 12/2014 | Hassine | ............ | G06F 9/45558 |
| | | | | 718/1 |
| 2015/0082288 A1* | 3/2015 | Dudyala | ............ | G06F 8/00 |
| | | | | 717/132 |
| 2016/0132324 A1* | 5/2016 | Elder | ............ | G06F 8/65 |
| | | | | 717/170 |
| 2017/0083290 A1* | 3/2017 | Bharthulwar | ............ | G06F 11/3688 |
| 2017/0180266 A1* | 6/2017 | Frank | ............ | H04L 67/16 |
| 2019/0319841 A1* | 10/2019 | Schick | ............ | H04L 41/0813 |

OTHER PUBLICATIONS

Popielas et al., "Simulation Life Cycle Management as Tool to Enhance Product Development and its Decision-Making Process for Powertrain Applications", May 2010, SIMULIA Customer Conference (Year: 2010).*

Rui et al., "A Software Process Tailoring Approach Using a Unified Lifecycle Template", 2009, IEEE (Year: 2009).*

Ma et al., "A Template-based Model Transformation Approach for Deriving Multi-Tenant SaaS Applications", 2012, Acta Polytechnica Hungarica, vol. 9, No. 2 (Year: 2012).*

Ljubicic et al., "Business Process Model Life-Cycle Management in Cloud Manufacturing", Jun. 2017, ASME (Year: 2017).*

Wu et al., "Effectively Deploying Virtual Machines on Cluster", 2008, IEEE (Year: 2008).*

Vmware, Inc. "vRealize Suite Lifecycle Manager 2.1: Installation, Upgrade, and Management", 2018, pp. 86-117.

* cited by examiner

FIGURE 1

ContentLibrary:Source

| Name | Version | Location | Created | | Test Passed | | Deleted | |
|---|---|---|---|---|---|---|---|---|
| | | | On | By | On | By | On | By |
| VM_A | v0 | DC0:VM_templates | | | | | | |
| VM_A | v1 | DC0:VM_templates | | | | | | |
| VM_A | v2 | DC0:VM_templates | | | | | | |
| VM_B | v5 | DC1:VM_templates | | | | | | |
| VM_B | v6 | DC1:VM_templates | | | | | | |
| VM_custom1 | v0 | DC1:VM_customspec | | | | | | |
| VM_custom2 | v3 | DC0:VM_customspec | | | | | | |
| VM_custom2 | v4 | DC0:VM_customspec | | | | | | |

LIFECYCLE MANAGEMENT OF VIRTUAL COMPUTE TEMPLATES

BACKGROUND

Existing cloud management software allows customers to deploy applications into public and private cloud environments. In many cases, templates such as virtual machine (VM) templates and templates for containers, are deployed into the cloud environments as components of the applications. However, developing and testing templates and releasing them into production environments have been a time consuming task for cloud administrators.

The task has been time-consuming because it requires a central server to manage and store all of the different versions of the templates while the templates go through development at development data centers and testing at testing data centers, and then to release the templates into production data centers after successful testing.

Even after successful testing, errors are discovered when the templates are deployed as components of their applications. When such errors are discovered, developing, testing, and releasing of the templates have to be repeated again.

SUMMARY

One or more embodiments provide a lifecycle manager for templates, that orchestrates the developing, testing, and releasing of such templates, and coordinates the movement of the templates between the development, testing, and production data centers without storing the underlying data of the templates locally. The lifecycle manager also tracks processes that have dependencies to the templates so that, prior to releasing the templates into production, all of the dependent processes can be tested and updated as necessary.

A method of updating templates, according to one embodiment of the lifecycle manager, includes the steps of (i) maintaining first, second, third, and fourth libraries of the templates at a lifecycle management server, wherein the first, second, third, and fourth libraries of the templates track versions and locations of the templates respectively stored in a first data center operating as a repository of all versions of the templates, a second data center in which updates to the templates are developed, a third data center in which the templates undergo unit testing, and a fourth data center to which the templates are released into production, (ii) copying a first template, which is one of the templates to be updated, from the first data center to the second data center, (iii) storing the first template that has been updated at the second data center in the third data center and performing unit testing on the updated first template at the third data center, and (iv) upon successful unit testing of the updated first template, copying the updated first template from the second data center to the first data center and releasing the updated first template into production by storing the updated first template in the fourth data center. The first library of the templates maintained at the lifecycle management server indicates the first template, prior to the update, as a first version, and is updated to indicate that the first template, after the update, as a second version that is a later version relative to the first version.

Further embodiments of the present invention include a non-transitory computer readable storage medium that includes instructions that enable a processing unit to implement one or more aspects of the above method, as well as a remote desktop system configured to implement one or more aspects of the above method.

DETAILED DESCRIPTION

Figure 1:
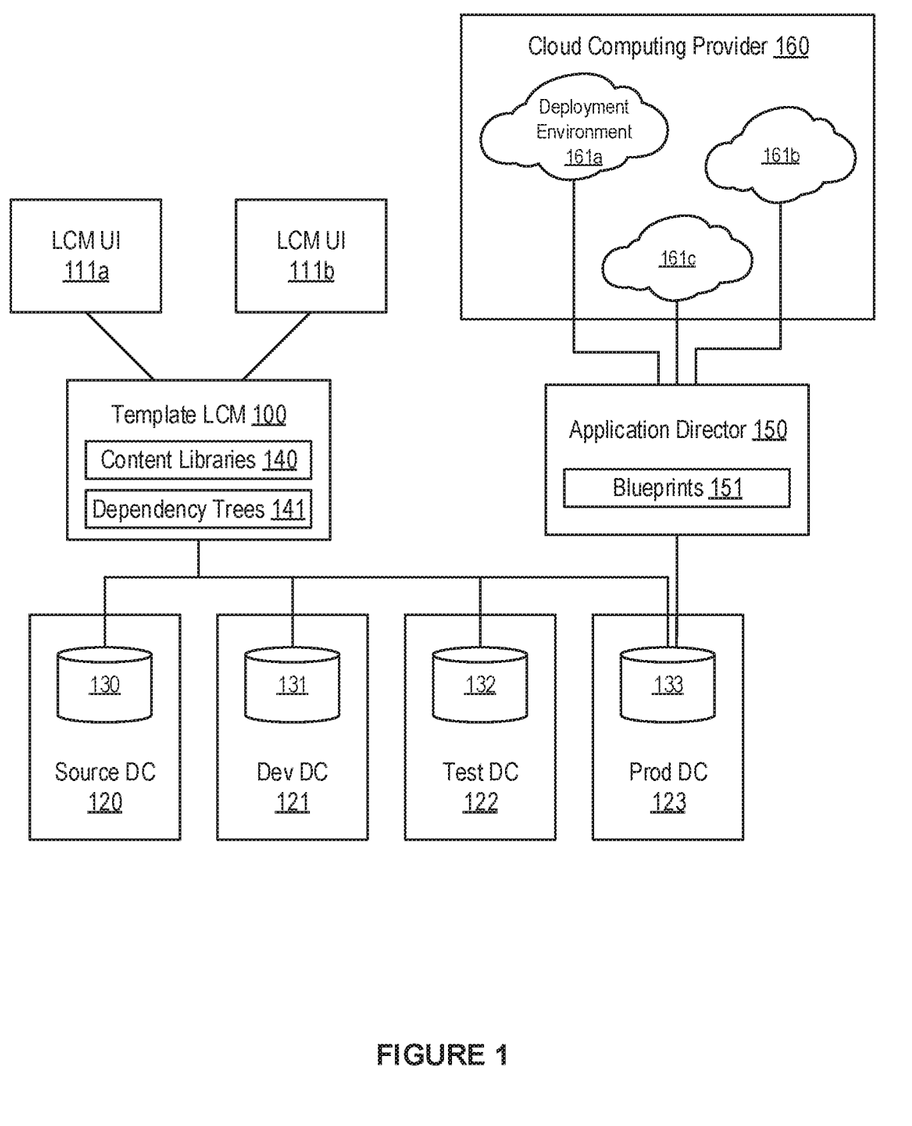
FIG. 1 is a schematic diagram illustrating computing environments in which templates are developed, tested, and released into production, according to one or more embodiments, and into which production-ready templates are deployed.

FIG. 1 is a schematic diagram illustrating computing environments in which templates are developed, tested, and released into production, according to one or more embodiments, and into which production-ready templates are deployed. The computing environments depicted in FIG. 1 include a source data center 120, a development data center 121, a testing data center 122, a production data center 123, and a plurality of deployment environments 161*a*, 161*b*, 161*c*, which are managed by a cloud computing provider 160.

In the embodiments illustrated herein, each of data centers 120-123 is a software defined data center (SDDC), which is a data storage facility implemented using an infrastructure that is virtualized and delivered as a service. After deployment of the SDDC, the SDDC provides policy-driven automation to enable provisioning and ongoing management of logical compute resources, such as VMs or containers, storage resources, and network resources. The SDDC can be private, public, or hybrid, and can run on multiple hardware stacks, hypervisors, and clouds. In addition, for convenience, a single data center is shown for each of data centers 120-123. However, in practice, each of data centers 120-123 may be one or multiple data centers.

Source data center 120 maintains a data store 130 in which copies of all versions of templates, e.g., VM templates and/or templates for containers, are stored. New templates and new versions of existing templates are developed in development data center 121. During development, templates are stored in data store 131. Testing of the templates are carried out in testing data center 122. During testing, templates are stored in data store 132. Upon successful testing, templates are released into production by storing them in data store 133.

A template lifecycle manager (LCM) 100 is software running in a physical or virtual server. LCM 100 is accessed through a user interface (UI). Two such UIs are illustrated in FIG. 1. They are LCM UI 111*a* and LCM UI 111*b* and may be accessed at the same time by different administrators. For example, LCM UI 111*a* may be accessed by a testing administrator while LCM UI 111b is accessed by a release administrator. LCM 100 employs role-based access control (RBAC) to restrict certain actions by an administrator based on the administrator's role. For example, a development administrator will be allowed to capture a template from source data center 120 but will not be allowed to release a template to production. Similarly, a release administrator will be allowed to release a template to production but will not be allowed to copy a template into testing data center 122. LCM 100 also employs RBAC to designate which administrator can define policies that are enforced to ensure that the right content be deployed to appropriate endpoints. For example, a policy may be defined to allow only production-grade containers to be retrieved from the content store and deployed to various release endpoints.

Figure 2:
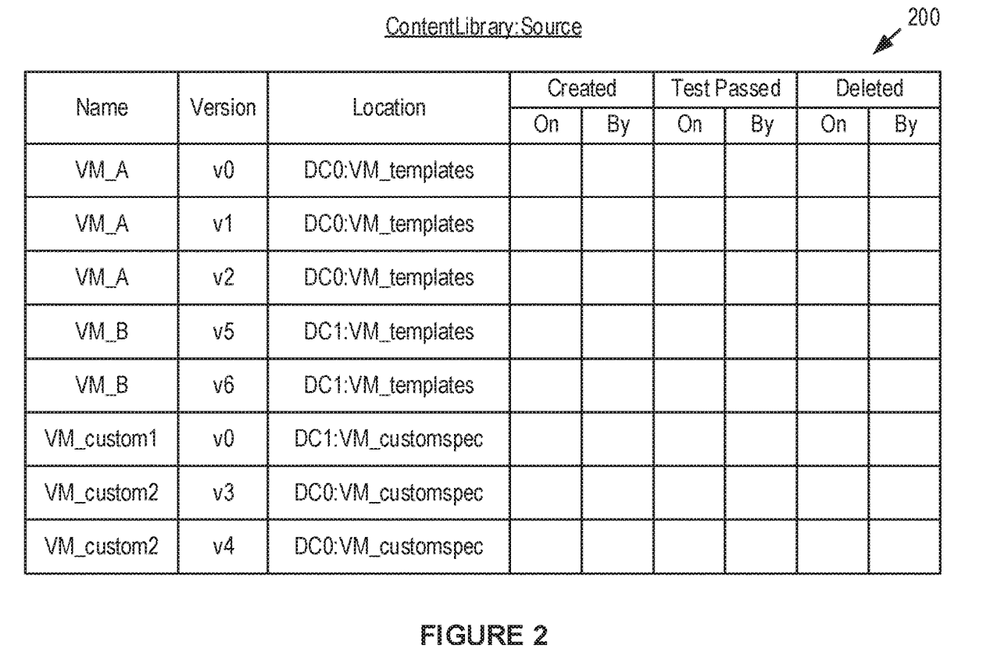
FIG. 2 illustrates a data structure maintained by a lifecycle management server to manage templates according to one or more embodiments.

Administrators set up content endpoints of LCM 100 through the LCM UI. The content endpoints of LCM 100 illustrated in FIG. 1 include data stores 130, 131, 132, 133 and LCM 100 stores in memory content libraries 140 for each of the data stores. An example content library 200 is illustrated in FIG. 2. As shown in FIG. 2, content library 200 includes a plurality of rows, each corresponding to a version of a particular template (in the example, VM templates) or customer specification (in the example, customer specification for a VM). The columns of content library 200 represent attributes of the template, which include name, version, location, when created, who created, when test passed, who performed test, when deleted, and who deleted. In content library 200, rows 1-3 store attributes of template A and rows 4-5 store attributes of template B. Rows 6-8 of content library 200 store attributes of custom specifications. In the embodiments illustrated herein, the location of the templates is represented by a data center name and a folder in the data center. Also, the "when" attributes are represented by timestamp including date and time, and the "who" attributes are represented by a user ID. The "when" and "who" attributes allow for the templates to be auditable and traceable.

Content library 200 represents a content library maintained by LCM 100 for templates stored in data store 130 of source data center 120. LCM 100 maintains content libraries with similar structures for templates stored in data store 131 of development data center 121, data store 132 of testing data center 122, and data store 133 of production data center 123.

Data store 130 of source data center 120 also stores various application blueprints that are used in deploying applications, and workflows and other processes that may be called or executed during deployment of the application according to the blueprints. Example workflows include configuration workflows, administration workflows, VM or container provisioning and deprovisioning workflows, and helper workflows (such as VM or container monitoring workflows). Example of other processes include various processes for operations management that provide, inter alia, status alerts and visibility across physical, virtual, and cloud infrastructures. According to one or more embodiments, LCM 100 evaluates all of the above processes for dependencies on templates and constructs dependency trees 141 for each of the templates. LCM 100 maintains dependency trees 414 for each of the templates in memory and traverses them when a corresponding template is being released into production, as will be described in conjunction with FIG. 5 below.

LCM 100 also enforces policies that restrict movement of data between the content endpoints. The policies are defined by administrators based on RBAC. The policies are defined so that, per environment (e.g., any of source, development, testing, and production data centers), a given endpoint can only support testing or production grade content. For example, policies may be defined for an endpoint to: (1) support template deployment; (2) specify which resources to allocate thereto (e.g., storage, compute, and/or network resources); (3) support the ability to test the content; (4) allow only production-grade templates. As a result of enforcing these policies, it is ensured that only the right data (content templates, custom specifications, etc.) are deployed to appropriate endpoints. For example, test content cannot be pushed to production unless it has passed the testing criteria.

Figure 3:
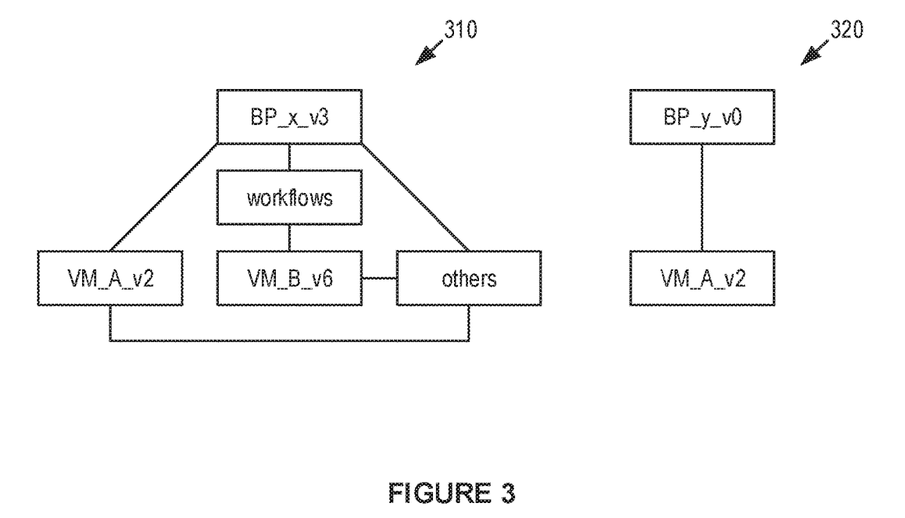
FIG. 3 is simplified diagram of dependency trees maintained by the lifecycle management to manage templates according to one or more embodiments.

FIG. 3 illustrates two examples of dependency trees 310, 320. According to dependency tree 310, blueprint BP_x_v3 has dependencies on certain workflows, template VM_A_v2 and other processes. In addition, certain workflows have dependencies on template VM_B_v6 and other processes have dependences on template VM_A_v2 and template VM_B_v6. According to dependency tree 320, blueprint BP_y_v0 has dependencies on template VM_A_v2 and nothing else.

After templates have been released to production data center 123, applications that employ such templates can be deployed into deployment environments 161a, 161b, 161c, which are managed by cloud computing provider 160. As illustrated in FIG. 1, an application director 150, which is software running in a physical or virtual server, carries out the deployment according to blueprints 151.

Figure 4:
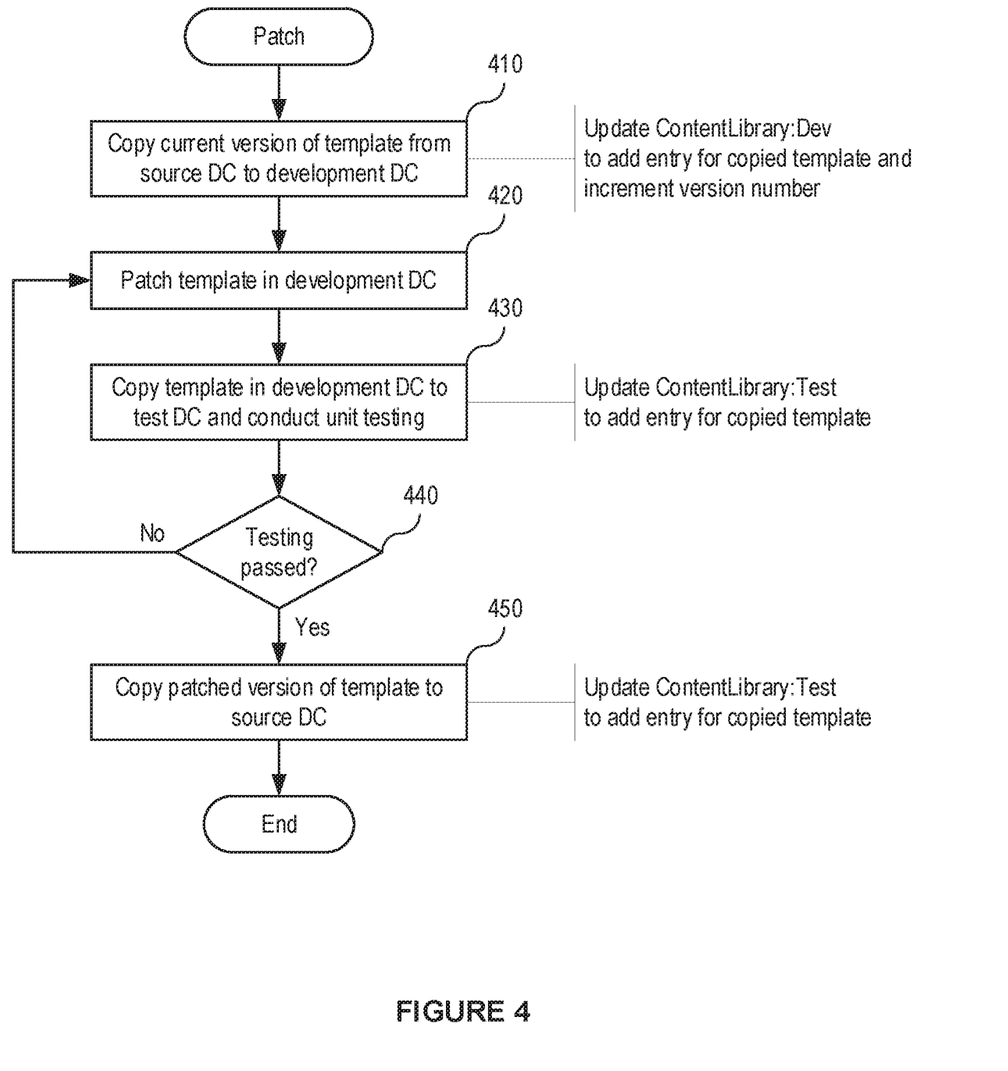
FIG. 4 is a flow diagram of a method for patching templates according to one or more embodiments.

FIG. 4 is a flow diagram of a method for patching templates according to one or more embodiments. The need for patching a template may have been triggered by a discovery of bug or a security vulnerability in a production-ready template. Upon detecting this need, the method of FIG. 4 is executed by LCM 100 to develop an updated, patched version of the template.

The method of FIG. 4 begins at step 410, where LCM 100 copies the current version of the template from source data center 120 to data store 131 of development data center 121. The current version of the template in source data center 120 is determined using content library 200 (ContentLibrary: Source, which is the content library for source data center 120), e.g., by evaluating all entries having a matching name are stored. If there are multiple such templates, the one with the latest creation date, also having an attributes of test passed and not deleted, is selected as the current version. Upon copying, LCM 100 updates the content library for development data center 121, ContentLibrary:Dev, to add a new entry for the template that has been copied from source data center 120, and increments the version number. LCM 100 also adds to the new entry the location (i.e., data center name and folder name) in which the copied VM is stored, the creation timestamp, and user ID of the administrator logged into LCM 100 during the patching.

At step 420, developers perform patching of the template with the incremented version number that is stored in development data center 121. Thereafter, the patched template is tested in testing data center 122. To allow for the testing of the patched template, LCM 100 at step 430 copies the patched template from development data center 121 to data store 132 of testing data center 122. Upon copying, LCM 100 updates the content library for testing data center 122, ContentLibrary:Test, to add a new entry for the template that has been copied from development data center 121. The version number is not changed by LCM 100 in the new entry. LCM 100 adds to the new entry the location (i.e., data center name and folder name) in which the copied template is stored, the creation timestamp, and user ID of the administrator logged into LCM 100 during the copying of the patched template to data store 132 of testing data center 122.

At step 440, test personnel performs unit testing of the template stored in testing data center 122. If the unit test passes, LCM 100 executes step 450. Otherwise, LCM 100 returns to step 420, where the template is further patched by developers.

At step 450, which is reached when the patched template passes testing, LCM 100 copies the patched template to data store 130 of source data center 120. LCM 100 also adds a new entry to content library 200 for the patched template, which has the same name and location as the earlier version but a different version number as assigned during the patching. LCM 100 also adds to the new entry the creation timestamp, and user ID of the administrator logged into LCM 100 during the patching. After step 450, the patched template is ready for release.

Figure 5:
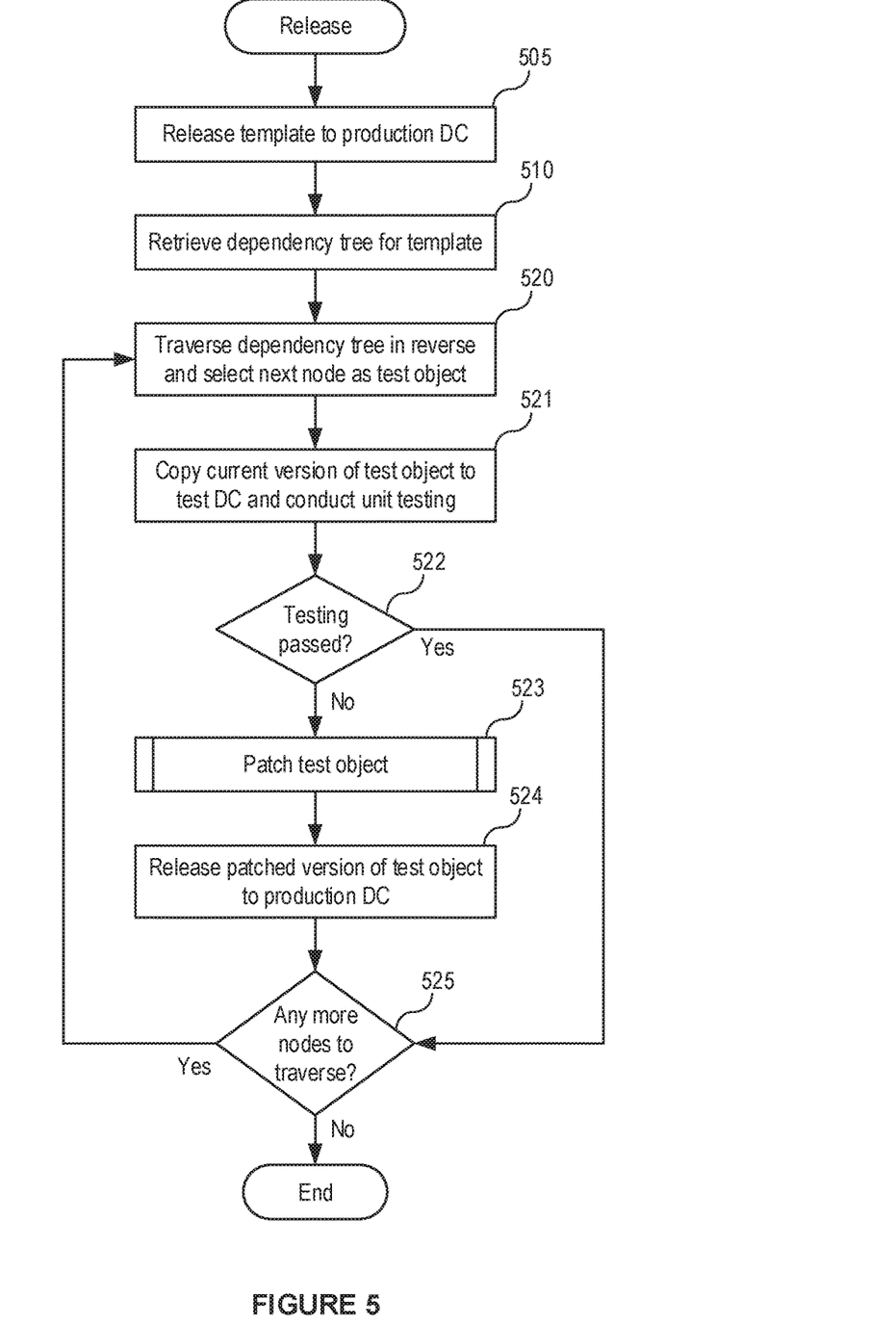
FIG. 5 is a flow diagram of a method for releasing components of an application, including a template, according to one or more embodiments.

FIG. 5 is a flow diagram of a method for releasing components of an application, including a template, according to one or more embodiments. For releasing a template, a release administrator logs into LCM 100.

The method of FIG. 5 begins at step 505, at which LCM 100 releases the template to production data center 123 by copying the template for release from source data center 120 to data store 133 of production data center 123. Upon copying, LCM 100 updates the content library for production data center 123, ContentLibrary:Prod, to add a new entry for the template that has been copied from source data center 120. The version number is not changed by LCM 100 in the new entry. LCM 100 adds to the new entry the location (i.e., data center name and folder name) in which the copied template is stored, the creation timestamp, and user ID of the administrator logged into LCM 100 during the copying of the template to data store 133 of production data center 122.

After step 505, LCM 100 at step 510 retrieves all of the dependency trees for the released template. For each of the dependency trees, LCM 100 executes steps 520-525.

At step 520, LCM 100 traverses the dependency tree in reverse starting from the released template and selects the next node (which may be a process being executed according to a blueprint, a workflow, or other processes) as a test object. Then, at step 521, LCM 100 copies the current version of test object to data store 132 of testing data center 122 for unit testing thereon. If testing passes at step 522, LCM skips to step 525. On the other hand, if testing fails at step 522, the test object is patched at 523, following the same steps as when a template is patched in the method of FIG. 4. Upon successful patching, at step 524, the patched version of the test object is released to production data center 123.

At step 525, LCM 100 determines if there are any more nodes in the dependency tree to traverse. If there are, the method loops back to step 520. If there are no more, the method ends, and the release of the template and all processes that have dependencies to the template is completed.

After the method of FIG. 5 is completed, application director 150 is able to deploy applications that employ the released template into one or more deployment environments 161*a*, 161*b*, 161*c* as operating virtual computing instances (e.g., operating VMs or operating containers). However, while the deployed applications are running, VMs executing helper workflows to monitor the status of the operating virtual computing instances deployed with the application may detect an error in the operating virtual computing instances. In such a scenario, the method of FIG. 6 is carried out by LCM 100 according to one or more embodiments.

Figure 6:
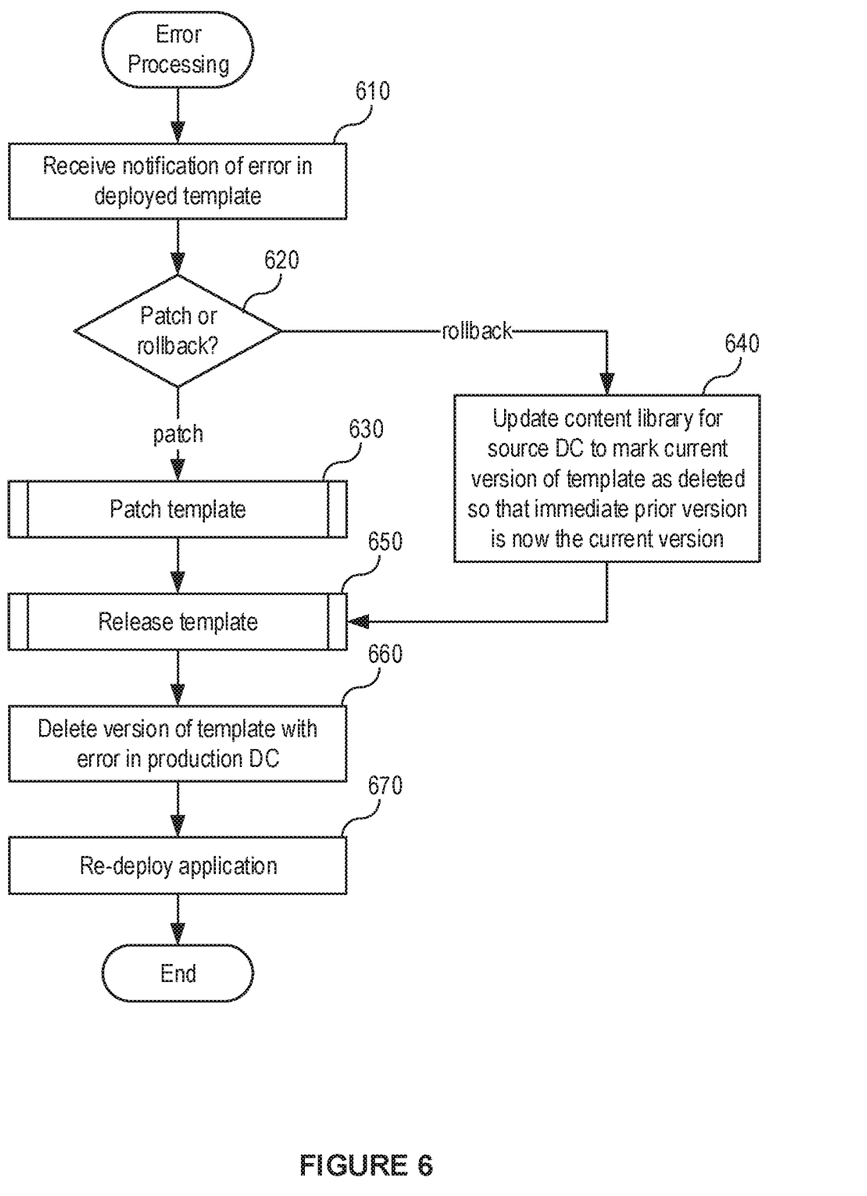
FIG. 6 is a flow diagram of a method for processing an error detected in a deployed template according to one or more embodiments.

The method of FIG. 6 begins at step 610, at which LCM 100 is notified by one of the VMs executing helper workflows that there is an error in an operating virtual computing instance configured in accordance with a production-ready template or by a provider of software running in the operating virtual computing instance of a security vulnerability. Upon being notified of this error, LCM 100 at step 620 prompts an administrator to decide between patching the corresponding template to correct the error or security vulnerability or rolling back to prior version of the template.

If the patching option is selected, the template is patched at step 630 in accordance with the method of FIG. 4 and the patched template is released to production along with dependent processes at step 650 in accordance with the method of FIG. 5.

If the rollback option is selected, LCM 100 at step 640 updates content library 200 to mark the current version of the template as deleted, so that the immediately prior version becomes the current version. Thereafter, the immediately prior version of the template is released to production along with dependent processes at step 650 in accordance with the method of FIG. 5.

After step 650, LCM 100 at step 660 deletes the template with the error from data store 133 of production data center 123. Then, at step 670, application director 150 re-deploys open more applications that have dependencies on the patched or rolled-back template.

In addition to functioning as an orchestrator for the testing and release pipeline as described above, LCM 100 provides a global view of the templates from a single management interface regardless of whether the source, development, testing, and production data centers are co-located or spread around the globe.

In the embodiments described above, VM templates and templates for containers are given as examples of templates that are managed by LCM 100. However, the scope of the embodiments is not limited to such templates and may be templates for other virtual computing instances. The term that is used herein to encompass all such templates is "virtual compute" templates.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of updating virtual compute (VC) templates, said method comprising:
maintaining first, second, third, and fourth libraries of the templates at a lifecycle management server, wherein the first library of the templates tracks versions and locations of the templates stored in a data store of a first data center operating as a repository of all versions of the templates, the second library of templates tracks versions and locations of the templates stored in a data store of a second data center in which updates to the templates are developed, the third library of templates tracks versions and locations of the templates stored in a data store of a third data center in which the templates undergo unit testing, and the fourth library of templates tracks versions and locations of the templates stored in a data store of a fourth data center to which the templates are released into production;
copying a first template, which is one of the templates to be updated, from the data store of the first data center to the data store of the second data center;
storing the first template that has been updated at the second data center in the data store of the third data center and performing unit testing on the updated first template at the third data center; and
upon successful unit testing of the updated first template, copying the updated first template from the second data center to the data store of the first data center and releasing the updated first template into production by storing the updated first template in the data store of the fourth data center,
wherein the first library of the templates maintained at the lifecycle management server indicates the first template, prior to the update, as a first version, and is updated to indicate that the first template, after the update, is a second version that is a later version relative to the first version.

2. The method of claim 1, further comprising:
maintaining a dependency tree for the first template at the lifecycle management server, wherein the dependency tree identifies processes that have dependencies to the first template,
wherein the updated first template is released into production after successful unit testing has been performed on each of the processes that have dependencies to the first template.

3. The method of claim 2, wherein the processes that have dependencies to the first template include a first process that is executed according to a blueprint for deploying an application.

4. The method of claim 3, wherein the processes that have dependencies to the first template include a second process that executes a workflow that is called during execution of the first process.

5. The method of claim 2, further comprising:
after releasing the updated template into production upon successful unit testing has been performed on the template and each of the processes that have dependencies to the first template, releasing one or more of the processes that have dependencies to the first template into production.

6. The method of claim 1, wherein the first template is further updated in the data store of the second data center prior to copying the updated first template from the data store of the second data center to the data store of the first data center if the unit testing on the updated first template fails.

7. The method of claim 1, further comprising:
deploying the second version of the first template as a component of a multi-tier application;
detecting an error in the deployed first template; and
upon detecting the error, rolling back to the first version of the first template.

8. The method of claim 7, wherein said rolling back to the first version includes:
marking the second version of the first template as deleted in the first library;
performing unit testing on each of the processes that have dependencies to the first template;
upon successful unit testing has been performed on each of the processes that have dependencies to the first template, releasing the first version of the template into production by deleting the second version of the first template from the data store of the fourth data center and storing the first version of the first template in the data store of the fourth data center; and
deploying the first version of the template as the component of the multi-tier application.

9. The method of claim 1, wherein each of the templates is a virtual disk of a virtual machine (VM).

10. The method of claim 1, wherein the first, second, third, and fourth libraries of the templates maintain timestamps for each version to indicate a point in time at which the version of the template was stored in the data store of a respective first, second, third, or fourth data center.

11. A computer system, comprising:
a first data center operating as a repository of all versions of virtual compute (VC) templates;
a second data center in which updates to the templates are developed;
a third data center in which the templates undergo unit testing;
a fourth data center to which the templates are released into production, wherein each of the first, second, third, and fourth data center includes a data store; and
a lifecycle management server that includes a processor and a memory and maintains first, second, third, and fourth libraries of the templates, wherein the first library of the templates tracks versions and locations of the templates stored in the data store of the first data center, the second library of templates tracks versions and locations of the templates stored in the data store of the second data center, the third library of templates tracks versions and locations of the templates stored in the data store of the third data center, and the fourth library of templates tracks versions and locations of the templates stored in the data store of the fourth data center, and wherein the lifecycle management server is configured to perform an update to a first template by:
copying the first template from the data store of the first data center to the data store of the second data center;
storing the first template that has been updated in the second data center in the data store of the third data center and performing unit testing on the updated first template at the third data center; and
upon successful unit testing of the updated first template, copying the updated first template from the second data center to the data store of the first data center and releasing the updated first template into production by storing the updated first template in the data store of the fourth data center,
wherein the first library of the templates maintained at the lifecycle management server indicates the first template, prior to the update, as a first version, and is updated to indicate that the first template, after the update, is a second version that is a later version relative to the first version.

12. The system of claim 11, wherein
the lifecycle management server maintains a dependency tree that identifies processes that have dependencies to the first template, and
the updated first template is released into production after successful unit testing has been performed on each of the processes that have dependencies to the first template.

13. The system of claim 12, wherein the processes that have dependencies to the first template include a first process that is executed according to a blueprint for deploying an application.

14. The system of claim 13, wherein the processes that have dependencies to the first template include a second process that executes a workflow that is called during execution of the first process.

15. The system of claim 12, wherein
the lifecycle management server, after releasing the updated template into production upon successful unit testing has been performed on the template and each of the processes that have dependencies to the first template, releases one or more of the processes that have dependencies to the first template into production.

16. The system of claim 11, wherein the first template is further updated in the second data center prior to copying the updated first template from the data store of the second data center to the data store of the first data center if the unit testing on the updated first template fails.

17. The system of claim 11, further comprising:
an application director that deploys the second version of the template as a component of a multi-tier application, wherein
upon detecting an error in the deployed first template, the lifecycle management server rolls back the first template to the first version.

18. The system of claim 17, wherein the lifecycle management server rolls back the first template to the first version by:
marking the second version of the first template as deleted in the first library;
performing unit testing on each of the processes that have dependencies to the first template;
upon successful unit testing has been performed on each of the processes that have dependencies to the first template, releasing the first version of the template into production by deleting the second version of the first template from the data store of the fourth data center and storing the first version of the first template in the data store of the fourth data center; and
deploying the first version of the template as the component of the multi-tier application.

19. The system of claim 11, wherein each of the templates is a virtual disk of a virtual machine (VM).

20. The system of claim 11, wherein the first, second, third, and fourth libraries of the templates maintain timestamps for each version to indicate a point in time at which the version of the template was stored in the data store of a respective first, second, third, or fourth data center.

* * * * *